United States Patent [19]

Helbling

[11] Patent Number: 4,540,427
[45] Date of Patent: Sep. 10, 1985

[54] METHOD FOR IMPROVING WATER RETENTION QUALITIES OF SOIL AND AN AGENT FOR PERFORMING THIS METHOD

[75] Inventor: Gottfried Helbling, Pfäffikon, Switzerland

[73] Assignee: Isaflex AG, Schlieren, Switzerland

[21] Appl. No.: 360,387

[22] Filed: Mar. 22, 1982

Related U.S. Application Data

[63] Continuation of Ser. No. 168,134, Jul. 14, 1980, abandoned.

[30] Foreign Application Priority Data

Jul. 31, 1979 [CH] Switzerland .......................... 7049/79

[51] Int. Cl.$^3$ ............................................... C05G 3/04
[52] U.S. Cl. ............................................ 71/27; 71/3; 71/903; 71/904; 47/9
[58] Field of Search .............. 47/9, DIG. 7, DIG. 10; 71/1, 11, 27, 903, 904, DIG. 1, 3, 64.07; 525/296; 526/306

[56] References Cited

U.S. PATENT DOCUMENTS

| | | | |
|---|---|---|---|
| 2,856,380 | 10/1958 | Roth | 260/41 |
| 3,336,129 | 8/1967 | Herrett et al. | 71/92 |
| 3,973,355 | 8/1976 | McKenzie | 47/37 |
| 4,076,663 | 2/1978 | Masuda et al. | 260/17.4 GC |
| 4,172,066 | 10/1979 | Zweigle et al. | 526/366 X |

FOREIGN PATENT DOCUMENTS

| | | |
|---|---|---|
| 730464 | 5/1955 | United Kingdom . |
| 1074246 | 9/1967 | United Kingdom . |
| 1183456 | 3/1970 | United Kingdom . |
| 1311392 | 4/1973 | United Kingdom . |
| 1319536 | 6/1973 | United Kingdom . |
| 1354784 | 5/1974 | United Kingdom . |
| 1376691 | 12/1974 | United Kingdom . |
| 1437266 | 5/1976 | United Kingdom . |
| 1458584 | 12/1976 | United Kingdom . |

*Primary Examiner*—Ferris H. Lander
*Attorney, Agent, or Firm*—Cushman, Darby & Cushman

[57] ABSTRACT

A method for improving the water conservation properties of soil. The method increases the ability of the soil to absorb and retain water and acts to stabilize the loosening of break-up of the soil.

5 Claims, No Drawings

METHOD FOR IMPROVING WATER RETENTION QUALITIES OF SOIL AND AN AGENT FOR PERFORMING THIS METHOD

This is a continuation, of application Ser. No. 168,134, filed July 14, 1980 and now abandoned.

FIELD OF THE INVENTION

The present invention relates to a method for improving the water conservation properties of soil and provides an agent for this purpose.

DISCUSSION OF THE PRIOR ART

Various methods for improving the water conservation properties of soil are known. Some methods are merely mechanical improvements such as drainage, while others employ physiochemical agents such as expanded plastic particles as additions to the soil.

As an example of the latter, U.S. Pat. No. 3,373,355 describes a chemical method for the improvement of container-free plant soils. Plant growth materials, such as vermiculites, perlites, sand, sawdust, wood fibers, humus, and other particulate form matter are externally coated with an aqueous gel of water-insoluble, yet water-absorbing, cross-linked polymer, such as polyacrylamide. This mixture of particulate plant growth material and cross-linked polymer gel is made in bulk and then dried to such an extent that it does not disintegrate on remoistening. Once added to the soil, the mixture absorbs and retains water for plant growth. However, it is apparent that this technique is not suitable for improving the water retention properties of soils in large quantities, particularly as in large growing areas under cultivation or with soil used for growing grass. Similarly, it is not practical for use with potted plants which must be grown in containers of limited size. The described example is generally representative of the chemical agents employed.

It is significant that such chemical soil improvement methods have consistently used unstable, degradable materials as soil supplements. So far as is known, no chemical method for improving the water conservation properties of soil has ever used stable, non-degradable materials for this purpose.

SUMMARY OF THE INVENTION

The present invention is a method for increasing the water absorption properties and improving the water retention capacity of soils found in desert climatic conditions or of soils maintained within enclosed areas. The method comprises the steps of mixing the soil with a 1 to 20% portion by weight of cross-linked anionic polyacrylamide, introducing this soil mixture into the main root area of the plant, and watering the soil mixture so that its volume of the polyacrylamide swells to at least 200% of its original size. The polyacrylamide agent used in preparing this soil mixture consists substantially of polyacrylamide which has an average particle size of 0.5 to 5.0 mm, is able to absorb water, become a gel, and is difficult to rot. Once mixed with the soil, the polyacrylamide is able to absorb water repeatedly and subsequently release it again indefinitely. By this method, the polyacrylamide effectively reduces the water evaporation of the soil and acts to stabilize the loosening or breaking up of desert soils, of soils with properties similar to desert soils, and of potted plant soils grown under desert climatic conditions or within enclosed areas.

DESCRIPTION OF THE PREFERRED EMBODIMENT

The present invention is a method for increasing the water absorptivity of soil, improving the water retention capacity, reducing the rate of water evaporation of soil, and stabilizing the loosening or breaking up of desert soils or of soils having similar characteristics. Such soils include potted plant soils grown under desert climatic conditions or maintained within enclosed spaces. The method comprises mixing the locally available soil with a cross-linked, anionic polyacrylamide to form a soil mixture. The polyacrylamide is present in the soil mixture in the ratio of 1 to 20% by weight. This soil mixture is introduced into the main root areas of plants which are subsequently to be planted or is mixed with the root area of plants previously placed in the soil. Once the soil mixture surrounds the main root area of the plants, the plants are watered and the polyacrylamide component of the soil mixture absorbs the water and swells to at least 200% of its original size by volume.

The anionic polyacrylamide employed in this method is a gellable, water insoluble, difficult to rot, granular material having an average particle size ranging between 0.5 and 5.0 mm. This polyacrylamide agent has the singular ability to absorb water and subsequently release water to the soil in repeated cycles over an indefinite period of time. This agent is obtained by polymerizing large quantities of acrylamide with small amounts of N,N'-methylene bisacrylamide to yield an anionic cross-linked polymer.

In practising the present invention, the granular size of the polyacrylamide used in making the soil mixture should be adjusted to meet the local soil conditions. Where the local soil is fine or sandy, the polyacrylamide used in the soil mixture should have an average granular size approximately 0.5 mm in size. Where the local soil is heavy or contains loam, the average particle size of the mixture should exceed 1.0 mm. In addition, regardless of the nature of the soil and the size of the polyacrylamide granules used in preparing the soil mixture, conventional soil conditioning agents, fertilizers, pesticides, and other desirable materials can be added thereto without affecting the water absorbing capacity or subsequent water releasing properties of the mixture.

The method provided by the present invention gives excellent water conservation results in both desert soils and in pot growing soils. Several examples employing the present invention will now be described.

EXAMPLE 1

Approximately 20 kg of dry polyacrylamide granules were mixed with 1 cubic meter of fine desert sand. The polyacrylamide granules were an insoluble, non-toxic polymerized material obtained by the polymerization of 95% acrylamide and 5% N,N'-methylene bisacrylamide by weight. The polyacrylamide particle obtained ranged from 2.0 to 3.0 mm in size. The combined soil and granular polyacrylamide mixture was spread out level with existing plant roots in the ground and was abundantly watered. The grass planted therein grew in the normal time but only had to be watered once a week, compared to grass grown in the unprepared fine desert sand where daily watering was necessary.

In comparison to the local untreated soil, fine desert sand, the water absorption of the soil mixture prepared in accordance with the present invention was 60% higher than with fine desert sand alone. Moreover, the water retained in the soil mixture comprising local soil and polyacrylamide was more than 100% higher than the water retention of the unprepared local soil measured one day after watering. The maximum temperatures on the surface on both the unprepared local soil and soil mixture exceeded 70° C.

EXAMPLE 2

In order to evaluate the stabilizing properties of the present invention in sand dune soils, different desert resistant trees were planted at suitable intervals in the soil mixture prepared from sand dune soil and polyacrylamide as described in Example 1 and in unprepared sane dune soil. After watering all the plants several times, the trees were left to the natural desert climate. After one year, it was found that the trees in the unprepared sand dune soil had been unable to withstand the pressure of the dunes due to the lack of good roots. In comparison, the trees planted in the soil mixture prepared according to the present invention were mostly still standing and had stopped the advance of the sand dunes. The method comprising the present invention, when used with suitable plants, thus indirectly led to a stabilization of the desert soil. The evaporation rate of water from the prepared soil mixture was less than that in unprepared sand dunes and samples from the soil mixture which were taken several days after the final watering still had a definite palpable moisture which was not present in the unprepared soil samples.

The soil's capacity to retain water has added value in the desert. It should be noted that water used for watering purposes in desert areas often has a high residual salt content. By being able to reduce the frequency of watering and the quantity of water needed to irrigate the soil, the quantity of salt which is absorbed by the soil may be reduced. The soil mixture prepared using the present invention requires quantitatively less and fewer waterings, thus dramatically reducing the quantity of salt in the soil in comparison to the amount of salt absorbed by unprepared local desert soil.

EXAMPLE 3

Potted plants which required daily watering were placed in the soil mixture prepared as described in Example 1 but using an anionic polyacrylamide particle ranging from 1 to 2 mm in size. After the potted plants were introduced to the soil mixture, they needed watering only once or twice a week in comparison to the daily watering previously required. Other types of plants which had to be watered once a week using unprepared local soil, required watering only once every three weeks when planted in the soil mixture prepared by the present invention.

In view of the above description it is likely that modifications and improvements will occur to those skilled in the art which are within the scope of this invention, as defined by the appended claims.

What is claimed is:

1. A method for increasing the water absorptivity and water retention capacity of soil for growing plants, said method comprising the steps of:

mixing the soil with a 1 to 20% proportion of cross-linked, dry, solid, granular acrylamide polymer by weight, said acrylamide polymer being the product of cross-linking acrylamide with N,N'-methylene bisacrylamide in the absence of an inert filler, said dry, acrylamide polymer being in the form of granular particles having an average size in the range of 0.5 to 5.0 mm;

introducing this soil mixture to the main root areas of the plants; and watering said soil mixture such that said acrylamide polymer absorbs water and swells to at least 200% of its orginal volume.

2. The method are recited in claim 1 wherein said mixing step includes adding at least one agent selected from the group consisting of conditioning agents, fertilizers, and pesticides, to said soil and said cross-linked, dry, granular acrylamide polymer.

3. The method as recited in claim 1 wherein said granular acrylamide polymer is formed by cross-linking 95% acrylamide with 5% N,N'-methylene bisacrylamide by weight.

4. A soil conditioning agent able to absorb water and subsequently release it again in repeated cycles over an indefinite period of time, said agent consisting essentially of:

a dry, solid, granular acrylamide polymer formed by cross-linking 95% acrylamide with 5% N,N'-methylene bisacrylamide by weight, said cross-linked acrylamide polymer granules being gellable, water-insoluble, difficult to rot and having an average particle size in the range of 0.5 to 5.0 mm.

5. A method for increasing the water absorptivity and water retention capacity of soils in desert climates for growing plants without rendering the soil impermeable, said method comprising the step of mixing the existing soil with a 1 to 20% proportion by weight of a cross-linked anionic or nonionic acrylamide polymer obtained by the copolymerization of acrylamide and N,N'-methylene bisacrylamide, said acrylamide polymer being formed as a dry, solid, granular material having an average particle size in the range of 0.5 to 5.0 mm, being able to absorb water and become a gel and being difficult to rot.

* * * * *